(12) United States Patent  
Kumagai et al.

(10) Patent No.: US 6,985,195 B1  
(45) Date of Patent: Jan. 10, 2006

(54) REFLECTION TYPE LIQUID CRYSTAL DISPLAY AND METHOD FOR MANUFACTURING THE SAME AND MASK FOR MANUFACTURING REFLECTION TYPE LIQUID CRYSTAL DISPLAY

(75) Inventors: Munehito Kumagai, Kumamoto (JP); Kazunori Inoue, Kumamoto (JP); Keisuke Nakaguchi, Kumamoto (JP); Yoshinori Numano, Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 0 days.

(21) Appl. No.: 09/512,107

(22) Filed: Feb. 24, 2000

(30) Foreign Application Priority Data

Feb. 25, 1999 (JP) .................................. 11-047543  
May 31, 1999 (JP) .................................. 11-152047

(51) Int. Cl.  
*G02F 1/1335* (2006.01)

(52) U.S. Cl. .......................... 349/113; 349/187; 430/5; 430/319; 430/321

(58) Field of Classification Search ................ 349/113, 349/43, 158, 96, 122; 430/394, 396, 321, 430/319  
See application file for complete search history.

(56) References Cited

U.S. PATENT DOCUMENTS

| | | | | |
|---|---|---|---|---|
| 5,368,962 A | * | 11/1994 | Kiryu et al. | 430/7 |
| 5,434,026 A | * | 7/1995 | Takatsu et al. | 430/30 |
| 5,877,835 A | * | 3/1999 | Dunn et al. | |
| 5,994,157 A | * | 11/1999 | Aggas et al. | 438/30 |
| 6,052,162 A | * | 4/2000 | Shimada et al. | 349/38 |
| 6,140,668 A | * | 10/2000 | Mei et al. | 257/66 |
| 6,184,960 B1 | * | 2/2001 | Sawayama et al. | 349/139 |
| 6,190,777 B1 | * | 2/2001 | Asano et al. | 428/447 |
| 6,262,783 B1 | * | 7/2001 | Tsuda et al. | 349/113 |

FOREIGN PATENT DOCUMENTS

| | | |
|---|---|---|
| JP | 6-175126 | 6/1994 |
| JP | 7-198919 | 8/1995 |
| JP | 8-184846 | 7/1996 |
| JP | 9-90426 | 4/1997 |

* cited by examiner

*Primary Examiner*—Dung T. Nguyen  
*Assistant Examiner*—Thoi V. Duong  
(74) *Attorney, Agent, or Firm*—McDermott Will & Emery LLP

(57) ABSTRACT

A reflection type liquid crystal display is formed by an interlayer insulating film having appropriate unevenness of an inseparable pattern in a picture element region and having a contact hole of a separable pattern on a drain electrode of a TFT is formed by plainly applying a photosensitive insulating resin so that it may dissolve difference in level caused by a gate electrode wiring, source electrode wiring, and the TFT, and conducting exposure and development while changing exposure amount. The exposure of the insulating resin is conducted through divisional exposure in which the inseparable pattern and the separable pattern are arranged on different masks, and the inseparable pattern is exposed by a predetermined exposure amount of 20 to 80% of an exposure amount for the separable pattern.

4 Claims, 13 Drawing Sheets

Ultraviolet Transmissivity (Calculated Value) with respect to a-Si Film Thickness

REFLECTION TYPE LIQUID CRYSTAL DISPLAY AND METHOD FOR MANUFACTURING THE SAME AND MASK FOR MANUFACTURING REFLECTION TYPE LIQUID CRYSTAL DISPLAY

BACKGROUND OF THE INVENTION

1. Industrial Field

The present invention relates to a reflection type liquid crystal display for performing a display by reflecting incident light from outside and to a method for manufacturing the same. The invention also relates to a mask for manufacturing such a reflection type liquid crystal display.

2. Prior Art

Research and development have been aggressively conducted on a liquid crystal display serving as a flat panel display taking the place of a CRT display. In particular, a liquid crystal display characterized by consuming less electric power and having a thin configuration has been put into practical use in the field of a battery-driven small-sized television set, a notebook-type computer, a car-navigation system, a portable terminal apparatus, and so on.

An active-matrix-type TFT array utilizing a thin film transistor (hereinafter described as TFT) as a switching element is generally used as a driving method of the liquid crystal display because of high-quality display. The display has a transmission type construction or a reflection type construction. Unlike the transmission type, the reflection type does not require any back light source and consumes less electric power, and is extremely suitable for a portable terminal apparatus and so on. This reflection type liquid crystal display comprises a first insulating substrate having scanning lines and signal lines formed into a lattice configuration, a TFT, a reflex picture element electrode and so on, and a second insulating substrate having a color filter, a black matrix, an opposed electrode and so on. The first insulating substrate and the second insulating substrate are opposed to each other. A liquid crystal is placed between these substrates.

Display quality of the reflection type liquid crystal display is effectively improved by increasing an effective display area in a picture element portion of a liquid crystal display panel and increasing light utilization efficiency, i.e. increasing picture element aperture efficiency. It is said that a TFT array of high aperture efficiency picture element is effectively obtained by the steps of: forming an interlayer insulating film comprising insulating resin of a thickness enough to dissolve difference in level caused by the scanning lines, signal lines and TFT; forming a picture element electrode overlapping with the foregoing scanning lines and signal lines occupying a large area on the interlayer insulating film; and connecting the picture element electrode to a drain electrode of the TFT through a contact hole in the interlayer insulating film. In this method, it is possible to prevent a defect caused by unevenness on the substrate in rubbing process.

On the other hand, to increase light utilization efficiency, a method of using a picture element electrode combined with (or serving also as) a reflex film has been proposed, wherein the mentioned first insulating substrate receives a scattering light having good directivity without applying any scattering film on the incident light side (i.e., without adopting forward scattering plate method). In this method, a good scattering light is obtained by forming appropriate unevenness on the surface of the picture element electrode combined with the reflex film. A reflection type liquid crystal display, wherein this construction is adopted and unevenness is formed on the surface of the photosensitive insulating resin by a photolithography, is disclosed in the Japanese Patent Publication (unexamined) No. 90426/1997.

The conventional reflection type liquid crystal display comprises: a first substrate (a TFT array substrate) having a TFT including a matrix-shaped scanning electrode, a signal electrode, a semiconductor layer and so on, and a reflection type picture element electrode formed on a transparent insulating substrate, and electrode wiring formed around the picture element electrode; a second substrate (an opposed substrate) having a color filter, a black matrix (hereinafter described as BM), and an opposed electrode on another transparent insulating substrate opposed and adhered to each other; and a liquid crystal material injected in between the first substrate and the second substrate.

Display quality of the reflection type liquid crystal display is effectively improved by increasing the effective display area in the picture element portion of the liquid crystal display panel and increasing the light utilization efficiency, i.e. by increasing the picture element aperture efficiency. In order to obtain a TFT array of high aperture efficiency, a method has been proposed, in which after forming a TFT and electrode wiring on a transparent insulating substrate, a flat surface is formed thereon by forming an interlayer insulating film composed of a resin to coat them. Further, a reflex picture element electrode occupying a large area is formed on the interlayer insulating film in such a manner as to overlap with a scanning electrode and so on laid under the interlayer insulating film. The reflex picture element electrode and a drain electrode of the TFT are electrically connected through a contact hole formed in the interlayer insulating film.

As a method for further increasing the light utilization efficiency, a reflection type liquid crystal display has been proposed. In this method, a TFT array substrate is provided with a picture element electrode combined with a reflex film for obtaining a scattering light of good directivity, without adopting any forward scattering plate method for applying a scattering film on the incident light side. In such a reflection type liquid crystal display, a good scattering light is obtained by forming an appropriate unevenness on the surface of the picture element electrode combined with the reflex film.

The Japanese Patent Publications (unexamined) No. 175126/1994 and No. 184846/1996 disclose a reflection type liquid crystal display having a picture element electrode combined with the reflex film. In this liquid crystal display, minute unevenness on the surface of the resin forming the interlayer insulating film is formed by photolithography using a photosensitive resin (including resist and so on), and the picture element electrode consisting of a film having a high reflection characteristic is formed thereon. Thus, unevenness is formed on the surface of the picture element electrode.

The foregoing Japanese Patent Publication (unexamined) No. 90426/1997 discloses a method for forming simultaneously an unevenness pattern and a contact hole pattern by using a mask in which both unevenness pattern and contact hole pattern are formed and by changing dissolution velocity in development utilizing difference in size between them. It is, however, very difficult to form the contact hole and obtain stably the unevenness for the reflex film capable of obtaining a good scattering light on the resin surface at the same time. Moreover, in order to obtain a good scattering light without mirror reflection, it is necessary for the unevenness pattern to have a certain size. Since the dissolution velocity of the unevenness pattern is almost the same as that of a contact hole pattern, it is very difficult to form the unevenness pattern and the contact hole pattern with distinction between them.

Moreover, the Japanese Patent Publication (unexamined) 198919/1995 discloses a method for forming a reflex plate having unevenness on the surface by using an exposure mask of which transmission amount of light is controlled and by performing an exposure while changing the amount of light in multiple stages in a depth direction of a photosensitive film. However, it is necessary that there is not any flat portion in order to obtain a good scattering characteristic, and for example, approximately 200 to 300 uneven portions are required in one picture element in the case of a 12. 1SVGA array. With respect to 1,440,000 picture elements in all, it is necessary that each unevenness configuration between one picture element and another is uniform in order that there is no reflection spot. Consequently, a mask capable of conducting exposure satisfying such requirements becomes very expensive, and it is very difficult to manufacture such a mask. Moreover, the resin exposed and developed is treated with heat, whereby the resin is turned into fluid due to this heat treatment and is formed into a specific configuration defined according to the physical property value of the resin. A problem exists in that even when unevenness is formed changing the exposure amount in multiple stages, neighboring minute uneven portions disappear.

The invention was made to solve the above-discussed problems.

Furthermore, it is an object of the present invention to provide a method for manufacturing a reflection type liquid crystal display wherein a TFT array substrate of high aperture efficiency driven with a low electric power and having a superior display quality is stably obtained through a simple process.

More specifically, a method for manufacturing the reflection type liquid crystal display by forming minute unevenness on the surface of the picture element electrode combined with the reflex film by a photolithography has been proposed in order to increase the light utilization efficiency. In this method, however, when photosensitive resin used for forming the unevenness is exposed, ultraviolet light not absorbed by the photosensitive resin portion transmits through the transparent substrate, and a part of the unabsorbed ultraviolet light reflects at a substrate holder. In particular, the ultraviolet light reflected at an end portion of an absorption groove, etc. provided on the substrate holder becomes stray light which exposes the photosensitive resin near the absorption groove. This brings about minute difference in size of the unevenness configuration obtained in a region corresponding to the configuration of the absorption groove. In the case of forming a high reflex film on a film where such unevenness is formed, the unevenness portion having minute difference in size is also transferred to the high reflex film as it is. And such a portion is visually recognized as a reflection spot and picture quality of the display is eventually deteriorated.

SUMMARY OF THE INVENTION

The present invention was made to solve the above-discussed problems and has an object of obtaining in a high yield a reflection type liquid crystal display having good reflection characteristic and high display quality by forming appropriate unevenness on a reflex picture element electrode. It is a further object of the invention to provide a method suitable for manufacturing this display.

A method for manufacturing a reflection type liquid crystal display according to the invention includes:

a process of forming plural scanning lines and plural signal lines crossing the scanning lines on an insulating substrate and forming a switching element in each of picture element regions divided by the scanning lines and the signal lines;

a process of forming an interlayer insulating film having appropriate unevenness of an inseparable pattern in the picture element region and having a contact hole of a separable pattern on a drain electrode of the switching element by plainly applying a photosensitive insulating resin on the substrate so as to dissolve difference in level caused by the scanning lines, signal lines, switching element, and so on, and conducting exposure and development while changing an amount of exposure; and a process of forming a reflex picture element electrode having unevenness due to the interlayer insulating film at a position conforming to each of picture element regions and which is electrically connected to the switching element through the contact hole, by patterning after forming a high reflex film such as Al film on the interlayer insulating film.

It is preferable that, in the process of forming the interlayer insulating film, the insulating resin is exposed by divisional (split) exposure in which the inseparable pattern and the separable pattern are arranged on different masks, and the inseparable pattern is exposed by a predetermined exposure amount of 20 to 80% of the exposure amount for the separable pattern.

It is preferable that, in the process of forming the interlayer insulating film, the masks used in exposing the insulating resin have a shading material comprised of at least two layers including an ultraviolet filter layer for cutting ultraviolet rays at a predetermined value of 20 to 80% in a base material such as glass, and the ultraviolet filter layer is laid in a mask pattern opening portion located conforming to the picture element region.

It is preferable that the reflection type liquid crystal display according to the invention is manufactured by one of the foregoing methods.

A mask for manufacturing a reflection type liquid crystal display according to the invention comprises:

a first insulating substrate provided with scanning lines and signal lines formed into a lattice configuration, a TFT, an interlayer insulating film, a reflex picture element electrode, and so on;

a second insulating substrate which is provided with a color filter, an opposed electrode and so on, and is arranged to be opposite to the first insulating substrate; and a liquid crystal put between these two substrates;

wherein the reflection type liquid crystal display further comprises a shading material of at least two layers including an ultraviolet filter layer for cutting ultraviolet rays at a predetermined value of 20 to 80% in a base material such as glass, said ultraviolet filter layer being laid in a mask pattern opening portion located conforming to a picture element region.

Furthermore, it is preferable that an a-Si film is used as the ultraviolet filter layer and a Cr/CrOx film is used as the shading material for completely shading the ultraviolet rays.

A reflection type liquid crystal display according to the present invention comprises:

an insulating substrate;

scanning lines, a scanning electrode, and common electrode wiring formed on the insulating substrate;

an insulating film formed on the scanning lines, scanning electrode and common electrode wiring;

a semiconductor layer formed on the scanning electrode through the insulating film;

a first electrode and a second electrode forming a semiconductor element with the semiconductor layer;

signal lines connected to the first electrode;

an interlayer insulating film which is formed on the first electrode, second electrode and signal lines, absorbs difference in level of the scanning lines, first electrode, second electrode and signal lines, and possesses minute unevenness on the surface;

a first substrate having a reflex picture element electrode composed of a high reflex metal film having a configuration transferred to the interlayer insulating film as the unevenness on the surface of the interlayer insulating film and electrically connected to the second electrode through a contact hole provided in the interlayer insulating film; and a second substrate sandwiching and holding a liquid crystal material with the first substrate;

wherein the insulating substrate is processed not to permit any ultraviolet light to transmit therethrough.

It is preferable that the insulating substrate is processed so that the entire surface does not permit any ultraviolet light to transmit therethrough.

It is preferable that the insulating substrate is processed so that a display portion does not permit any ultraviolet light to transmit therethrough.

Furthermore, it is preferable that the insulating substrate is processed not to permit any ultraviolet light to transmit therethrough by forming an ultraviolet light absorption film on one face or both faces of a transparent insulating substrate or between two transparent insulating substrates.

It is preferable that the insulating substrate is processed not to permit any ultraviolet light to transmit by forming an ultraviolet light cut (untransmittable) film on one face or both faces of a transparent insulating substrate or between two transparent insulating substrates.

It is preferable that the insulating substrate is composed of transparent or colored ultraviolet-cut glass.

A reflection type liquid crystal display according to the present invention comprises:

a transparent insulating substrate;

scanning lines, a scanning electrode, and common electrode wiring formed on the insulating substrate;

an insulating film formed on the scanning lines, scanning electrode, and common electrode wiring;

a semiconductor layer formed on the scanning electrode through the insulating film;

a semiconductor film composed of the same film as the semiconductor layer;

a first electrode and a second electrode forming a semiconductor element with the semiconductor layer;

signal lines connected to the first electrode;

an interlayer insulating film which is formed on the first electrode, second electrode and signal lines, absorbs difference in level of the scanning lines, first electrode, second electrode and signal lines, and possesses minute unevenness on the surface;

a first substrate having a reflex picture element electrode composed of a high reflex metal film having a configuration transferred to the interlayer insulating film as the unevenness on the surface of the interlayer insulating film and electrically connected to the second electrode through a contact hole provided in the interlayer insulating film; and a second substrate sandwiching and holding a liquid crystal material with the first substrate;

wherein the semiconductor film is formed in a picture element region excluding the region where the scanning lines, signal lines, and the contact hole are formed.

A further method for manufacturing a reflection type liquid crystal display according to the invention, wherein two transparent insulating substrates, in which an electrode is formed on at least one of them, are arranged to be opposite and adhered to each other and a liquid crystal material is held between the two transparent insulating substrates, includes:

a process of forming an ultraviolet light absorption film or an ultraviolet light cut film such as a metal film and an insulation layer on one of the two transparent insulating substrates;

a process of forming scanning lines, a scanning electrode, and common electrode wiring on one face side or the opposite face side of the transparent insulating substrate where the ultraviolet light absorption film or the ultraviolet light cut film such as a metal film and the insulation layer are formed;

a process of forming an insulating film on the scanning lines, scanning electrode and common electrode wiring;

a process of forming a semiconductor layer on the scanning electrode through the insulating film;

a process of forming a first electrode and a second electrode forming a semiconductor element with the semiconductor layer and forming signal lines;

a process of forming an interlayer insulating film having a contact hole at a predetermined position and desired unevenness on the surface by applying photosensitive resin on the first electrode, second electrode, and signal lines and conducting exposure and development; and a process of forming a reflex picture element electrode having a configuration of the transferred unevenness on the surface of the interlayer insulating film and electrically connected to the second electrode through the contact hole by forming a high reflex metal film on the interlayer insulating film and in the contact hole, and conducting patterning.

A method for manufacturing a reflection type liquid crystal display according to the invention wherein ultraviolet-cut glass and a transparent insulating substrate, in which an electrode is formed on at least one of them, are arranged to be opposite and adhered to each other and a liquid crystal material is held between the ultraviolet-cut glass and the transparent insulating substrate, includes:

a process of forming scanning lines, a scanning electrode, and common electrode wiring on the ultraviolet-cut glass;

a process of forming an insulating film on the scanning lines, scanning electrode and common electrode wiring;

a process of forming a semiconductor layer on the scanning electrode through the insulating film;

a process of forming a first electrode and a second electrode forming a semiconductor element with the semiconductor layer, and forming signal lines;

a process of forming an interlayer insulating film having a contact hole at a predetermined position and desired unevenness on the surface by applying photosensitive resin on the first electrode, second electrode and signal lines, and conducting exposure and development; and a process of forming a reflex picture element electrode having a configuration of the transferred unevenness on the surface of the interlayer insulating film and electrically connected to the second electrode through the contact hole by forming a high reflex metal film on the interlayer insulating film and in the contact hole, and conducting patterning.

A method for manufacturing a reflection type liquid crystal display wherein two transparent insulating substrates, in which an electrode is formed on at least one of them, are arranged to be opposite and adhered to each other and a liquid crystal material is held between the two transparent insulating substrates, includes:

a process of forming scanning lines, a scanning electrode, and common electrode wiring on one of the two transparent insulating substrates;

a process of forming an insulating film on the scanning lines, scanning electrode, and common electrode wiring;

a process of forming a semiconductor layer on the scanning electrode through the insulating film;

a process of forming a first electrode and a second electrode forming a semiconductor element with the semiconductor layer, and forming signal lines;

a process of applying photosensitive resin on the first electrode, second electrode, and signal lines;

a process of sticking an ultraviolet-cut film on a face of the transparent insulating substrate opposite to the face where the photosensitive resin is applied;

a process of exposing the photosensitive resin;

a process of forming an interlayer insulating film having a contact hole at a predetermined position and desired unevenness on the surface by applying a development after exfoliating the ultraviolet-cut film; and a process of forming a reflex picture element electrode having a configuration of the transferred unevenness on the surface of the interlayer insulating film and electrically connected to the second electrode through the contact hole by forming a high reflex metal film on the interlayer insulating film and in the contact hole, and conducting patterning.

A method for manufacturing a reflection type liquid crystal display according to the invention wherein two transparent insulating substrates, in which an electrode is formed on at least one of them, are opposed and adhered to each other and a liquid crystal material is held between the two transparent insulating substrates, includes:

a process of forming scanning lines, a scanning electrode, and common electrode wiring on one of the two transparent insulating substrates;

a process of forming an insulating film on the scanning lines, scanning electrode and common electrode wiring;

a process of forming a semiconductor layer on the scanning electrode through the insulating film, and forming a semiconductor film in a predetermined region;

a process of forming a first electrode and a second electrode forming a semiconductor element with the semiconductor layer, and forming signal lines;

a process of forming an interlayer insulating film having a contact hole at a predetermined position and desired unevenness on the surface by applying photosensitive resin on the first electrode, second electrode and signal lines, and conducting exposure and development; and a process of forming a reflex picture element electrode having a configuration of transferred unevenness on the surface of the interlayer insulating film and electrically connected to the second electrode through the contact hole by forming a high reflex metal film on the interlayer insulating film and in the contact hole, and conducting patterning.

Other objects, features and advantages of the invention will become apparent in the course of the following description with reference to the accompanying drawings.

DESCRIPTION OF THE PREFERRED EMBODIMENT

Example 1

Figure 1:
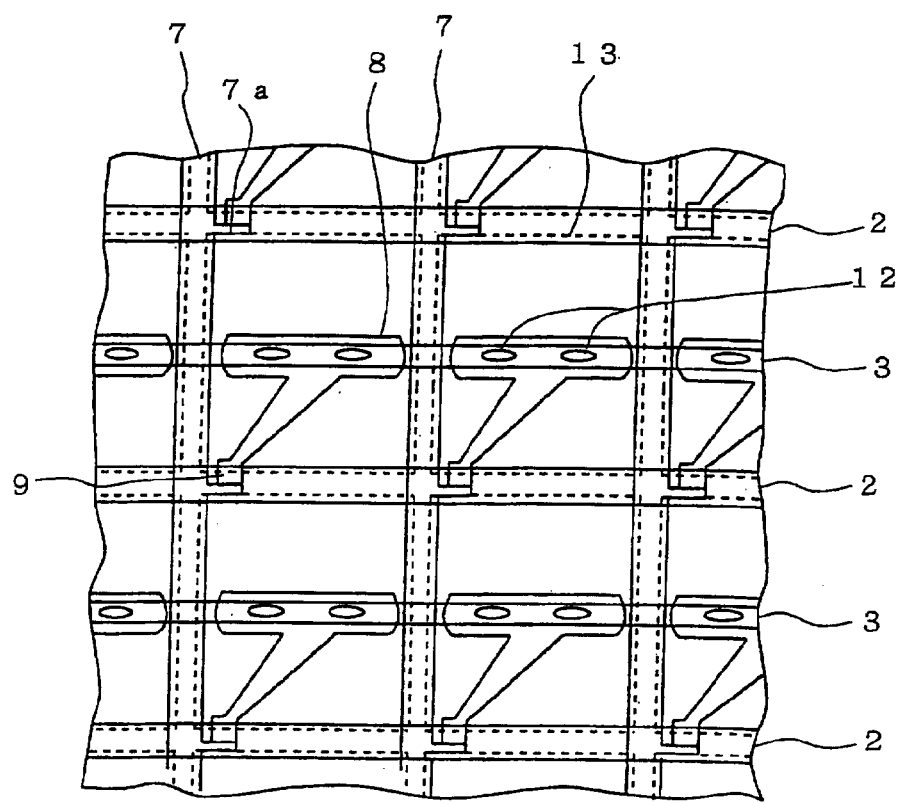
FIG. 1 is a partial top plan view showing a TFT array substrate forming a reflection type liquid crystal display of Example 1 according to the present invention.
Figure 2:
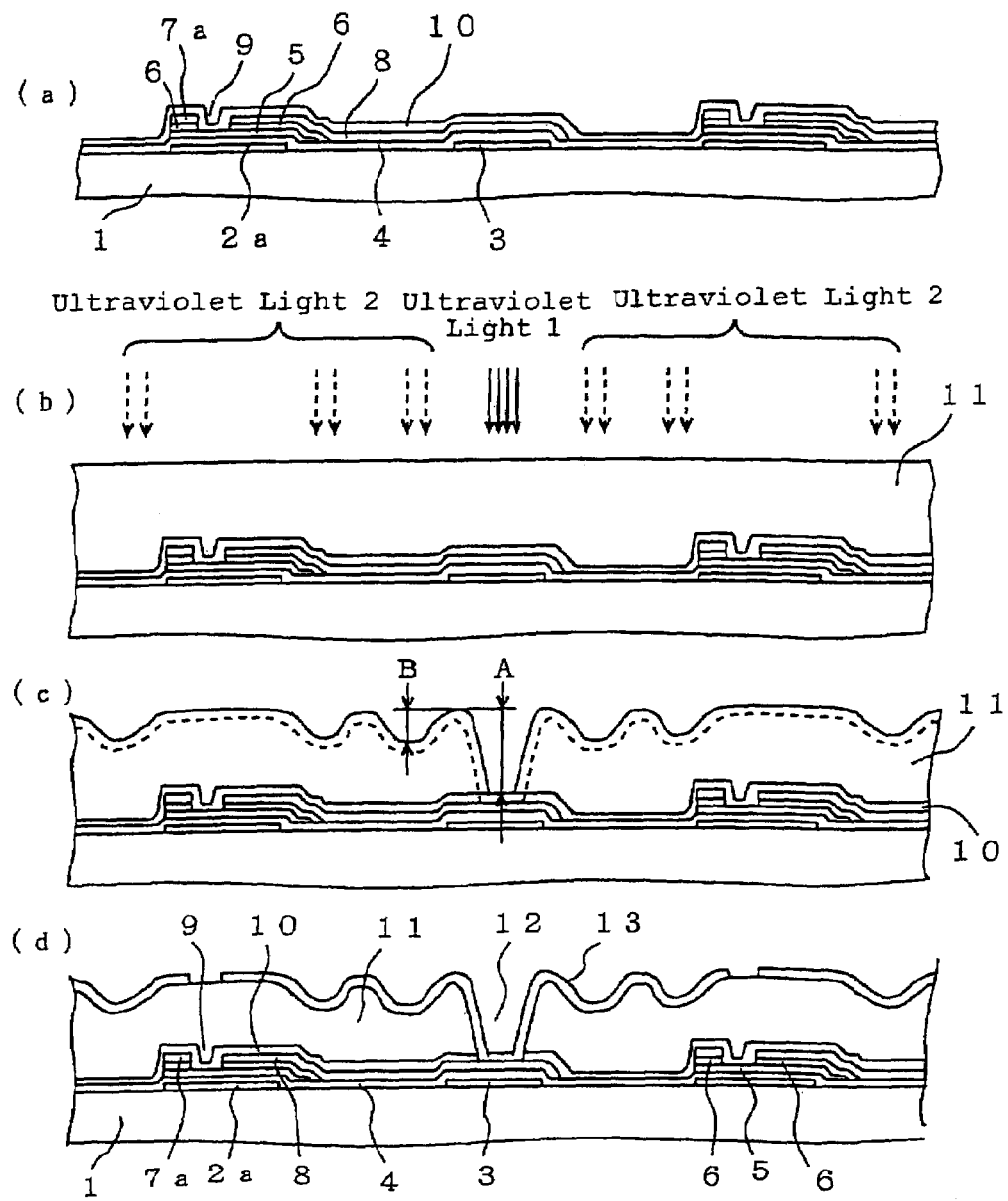
FIGS. 2(a), (b), (c) and (d) are partially sectional views each showing a part of a method of manufacturing the TFT array substrate in Example 1 according to the invention.

Several examples of the present invention are hereinafter described with reference to the drawings. FIG. 1 is a partial top plan view showing a TFT array substrate forming a reflection type liquid crystal display in this example, and FIG. 2 is a partially sectional view showing a part of a manufacturing process of the TFT array substrate in this example. In the drawings, reference numeral 1 is an insulating substrate such as a glass substrate, and numeral 2 is gate electrode wiring serving as scanning lines formed in a direction of row on the insulating substrate 1. Numeral 2a is a gate electrode, numeral 3 is common electrode wiring, and numeral 4 is a gate insulating film. Numeral 5 is an amorphous silicon film (hereinafter referred to as an a-Si film) to be a semiconductor layer of a TFT serving as a switching element formed in each picture element region divided by the gate electrode wiring 2 and source electrode wiring described later. Numeral 6 is a low-resistance amorphous silicon film (hereinafter described as an n$^+$-a-Si film) doped with impurities and to be an ohmic contact layer of the foregoing TFT. Numeral 7 is source electrode wiring serving as signal lines formed in a direction of train on the insulating substrate 1, numeral 7a is a source electrode, and numeral 8 is a drain electrode. Numeral 9 is a channel portion of the TFT, and numeral 10 is a passivation film for protecting the TFT. Numeral 11 is an interlayer insulating film which dissolves difference in level caused by the gate electrode wiring 2, source electrode wiring 7, and TFT and has unevenness intentionally formed on the surface. Numeral 12 is a contact hole in the interlayer insulating film 11, and numeral 13 is a reflex picture element electrode formed on the interlayer insulating film 11 and connected to the drain electrode 8 of the TFT through the contact hole 12.

A method for manufacturing the TFT array substrate in this example is hereinafter described with reference to FIG. 2. First, a film of Cr is formed on the insulating substrate 1 by a method such as sputtering, and the gate electrode wiring 2 and the common electrode wiring 3 are formed into a plurality of, lines by photolithography. Next, the gate insulating film 4 made of silicon nitride, the a-Si film 5, and the n$^+$-a-Si film 6 are successively formed by a method such as a plasma CVD. Then the a-Si film 5 and the n$^+$-a-Si film 6 are patterned by a photolithography, and the semiconductor layer of the TFT is formed. The source electrode wiring 7 of plural lines crossing the gate electrode wiring 2, the drain electrode 8, and the channel portion 9 of the TFT are formed by sputtering and photolithography. The TFT is formed in each picture element region divided by the gate electrode wiring 2 and the source electrode wiring 7. An end of the drain electrode 8 sandwiches the gate insulating film 4 which is an inorganic insulating film, and opposed with the common electrode wiring 3 in a lower layer made of low-resistance metal in the area of a reflex picture element electrode 13 formed later. Thus, a capacity (a capacitor) is formed. Then, the passivation film 10 for protecting the TFT is formed by a method such as a CVD (FIG. 2(a)).

Next, a photosensitive insulating resin is plainly applied on the mentioned substrate so as to dissolve difference in level caused by the gate electrode wiring 2, source electrode wiring 7, TFT, etc. And the interlayer insulating film 11 having appropriate unevenness serving as an inseparable pattern is formed in the picture element region, and the contact hole 12 serving as a separable pattern is formed on the drain electrode 8 of the TFT by exposure and development while changing the exposure amount. In this process, as the photosensitive insulating resin, a positive-type acrylic resin (PC-335 manufactured by JSR, photosensitive to i-rays and h-rays) of low dielectric constant (<4) was applied by approximately 4 μm. The unevenness was formed on the gate electrode wiring 2, on the source electrode wiring 7, and in the picture element region excluding a part of the mentioned capacitor formation positions. In this example, the insulating resin was exposed through divisional exposure in which the inseparable pattern and the separable pattern are formed on different masks, and the inseparable pattern is exposed by a predetermined exposure amount of 20 to 80% of the exposure amount for the separable pattern. As for the exposure apparatus, a stepper exposure apparatus for h-rays was used, and the contact hole 12 portion was exposed at 400 mj/cm$^2$ (ultraviolet light 1), and the unevenness in the picture element was exposed at 160 mj/cm$^2$ (ultraviolet light 2) (FIG. 2(b)).

Figure 3:
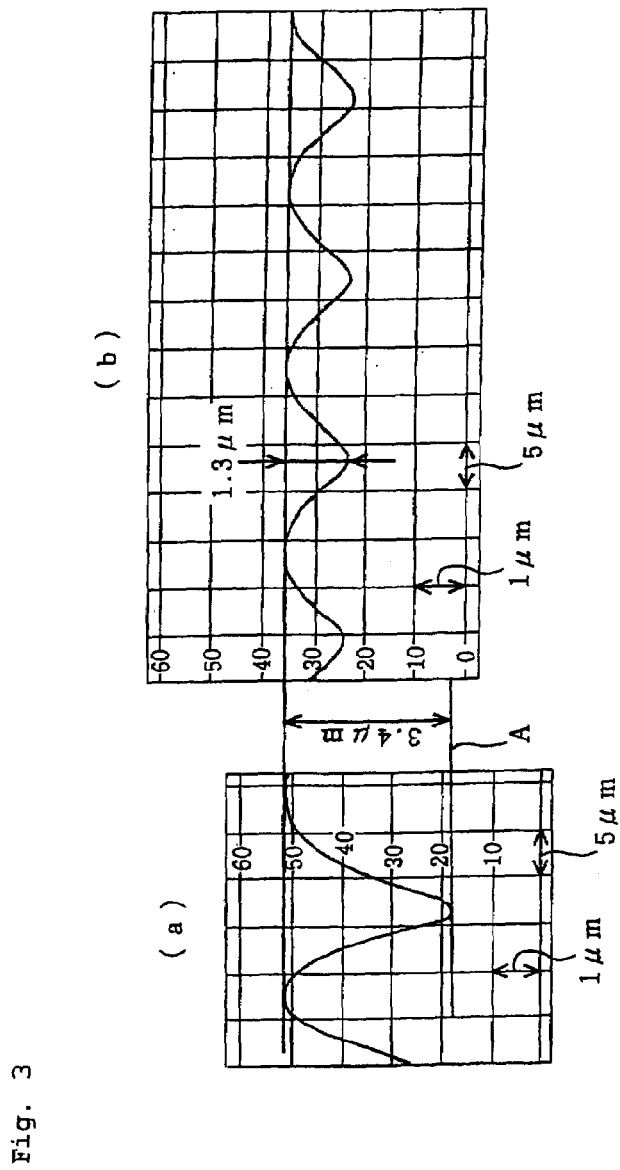
FIGS. 3(a) and (b) are graphs each showing a result of measuring a surface configuration of the interlayer insulating film formed in Example 1 of the invention with an instrument for measuring film thickness by touching with a needle.

Utilizing that the dissolution velocity of the positive-type photosensitive resin largely depends on the resolving rate of the photosensitive agent (this is hereinafter referred to as S-shaped curve characteristic), variation was established in resolving rate of the photosensitive agent between the unevenness portion in the picture element region and the contact hole 12 portion, thereby establishing a difference in resolving speed. Thus, a development was conducted taking a time enough to resolve the contact hole 12, and the contact hole 12 of a depth A and the unevenness of a depth B were respectively obtained (FIG. 2(c)). A weak alkaline developer (TMAH0.4 wt %) was used as the developer. After developing and printing for approximately one hour at 200 to 230° C., the interlayer insulating film 11 having the appropriate unevenness in the picture element region and the contact hole 12 on the drain electrode 8 of the TFT was formed. The surface of the interlayer insulating film 11 obtained through the foregoing process was measured with the instrument for measuring film thickness by touching with a needle, and the results of confirming the surface configuration are shown in FIG. 3. In the drawings, (a) shows configuration of the contact hole portion, and (b) shows that of the unevenness portion. In the drawing, A indicates a substrate face being a bottom portion of the interlayer insulating film 11. As described above, it was confirmed that the good unevenness and the contact hole 12 separated up to the bottom portion are formed in the manufacturing method according to this example.

Next, the passivation film 10 in the contact hole 12 portion is etched, and the drain electrode 8 is exposed in the contact hole 12. At the same time, the passivation film 10 in a terminal contact portion (not shown) including a transfer electrode is also removed. After forming a high reflex film such as an Al film on the interlayer insulating film 11, patterning was conducted. As a result, the reflex picture element electrode 13 which has unevenness due to the interlayer insulating film 11 at a position conforming to each picture element region and is electrically connected to the drain electrode 8 of the TFT through the contact hole 12 was formed (FIG. 2(d)). Orientation films are formed respectively on the surface of the TFT array substrate obtained through the foregoing process as well as on the surface of another insulating substrate where an opposed electrode and so on are formed. Then, a liquid crystal material is poured between the opposed two substrates, whereby the reflection type liquid crystal display in this example is achieved.

Though a film of Al was used as the reflex picture element electrode 13 in this example, it is also preferable to use a high reflex film such as a silver film. Reflection from an reduction of inferiority in display.

Example 2

Figure 4:
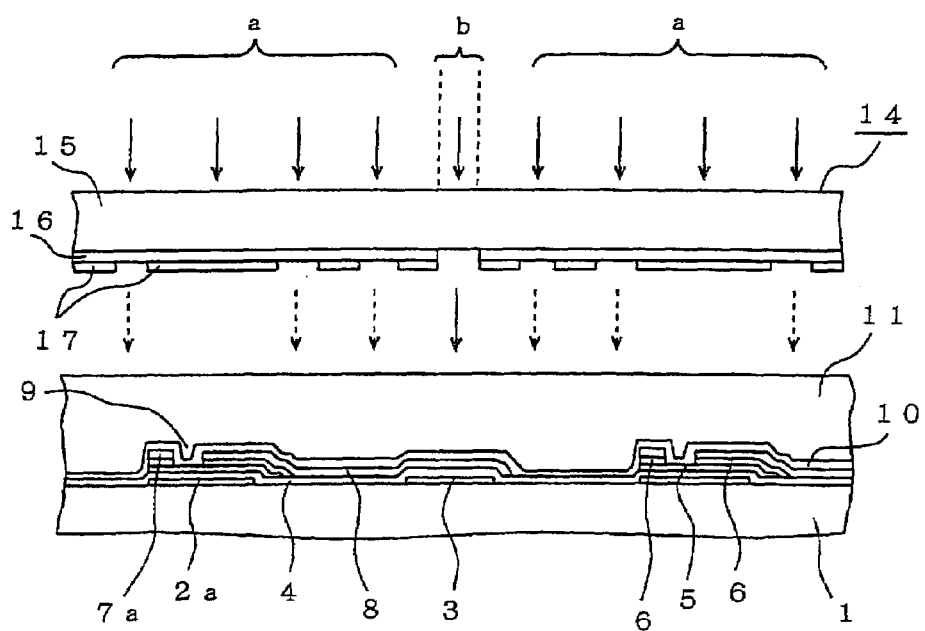
FIG. 4 is a partially sectional view showing a part of a method of manufacturing a TFT array substrate in Example 2 according to the invention.

FIG. 4 is a partially sectional view showing a part of a method for manufacturing a TFT array substrate according to Example 2 of the invention. In the drawing, numeral 14 is a mask used in this example, numeral 15 is a glass material which is a base material, numeral 16 is a shading material A which is an ultraviolet filter layer, and numeral 17 is a shading material B which completely cuts ultraviolet rays. In the drawing, a picture element pattern area is indicated by "a", and a contact hole pattern area is indicated by "b". The same numerals are designated to the same or like parts in the drawings, and any further description of them is omitted herein.

In this example, the mask 14 is used for manufacturing the reflection type liquid crystal display, in which the first insulating substrate provided with the gate electrode wiring 2 and the source electrode wiring 7 which are formed into a lattice configuration, the TFT, the interlayer insulating film 11, the reflex picture element electrode 13, and so on and the second insulating substrate provided with the color filter, the opposed electrodes, and so on, are opposed to each other, and a liquid crystal is put between these substrates. The mask 14 is used for exposing the insulating resin for forming the interlayer insulating film 11. The mask 14 has a shading material (the shading material A 16 and the shading material unnecessary portion is restrained by forming the interlayer insulating film 11 of a colored resin such as black resin. Furthermore, it is preferable to arrange various sizes of unevenness patterns of the interlayer insulating film 11 at random. In this example, though the passivation film 10 was laid under the interlayer insulating film 11, and it is also preferable not to use the passivation film 10. A stepper method is used and divisional exposure wherein assignment of exposure patterns is changed is conducted in this example, therefore the treating capacity is not deteriorated as compared with any conventional method. It is possible to adopt an en bloc (batch) exposure method, but it is not always suitable because the processing capacity is largely lowered.

As described above, in the TFT array substrate manufactured according to this example, since the interlayer insulating film 11 is formed to have a sufficient thickness, it is possible to form the reflex picture element electrode 13 overlapping with the gate electrode wiring 2 and the source electrode wiring 7 occupying a large area in the top layer. In this manner, it is possible to obtain stably through a simple process a reflection type liquid crystal display of high aperture efficiency wherein the liquid crystal is sufficiently driven by a low electric power, the contrast is high, and the display quality is superior. It is also possible to save the manufacturing cost because the yield is improved owing to B 17 in this example) comprising at least two layers including the ultraviolet filter layer for cutting ultraviolet rays at a predetermined value of 20 to 80% in a base material such as glass. In the mask 14, the ultraviolet filter layer is laid at a mask pattern opening portion located conforming to the picture element region.

The method for manufacturing the TFT array substrate in this example is described below. However, as the process is similar to that in the foregoing Example 1 until the step of forming the passivation film 10 for protecting the TFT on the insulating substrate 1, further description is omitted herein.

After forming the passivation film 10, a positive-type photosensitive acrylic resin (PC-335 manufactured by JSR, photosensitive to i-rays and h-rays) of a low dielectric constant (<4) is plainly applied on the surface so that difference in level caused by the gate electrode wiring 2, source electrode wiring 7, and TFT may be dissolved. The, exposure and development are conducted using the mask 14 by photolithography, whereby appropriate unevenness is formed on the gate electrode wiring 2, on the source electrode wiring 7, and in the picture element region excluding a part of said capacity formation position. And a contact hole is formed on the drain electrode 8.

In the foregoing Example 1, the unevenness in the picture element region and the contact hole on the drain electrode 8 were formed on different masks, and were exposed dividedly with different exposure amounts. And it is confirmed that good unevenness and a contact hole are formed by exposing the contact hole portion at 400 mj/cm$^2$ and the unevenness in the picture element region at 160 mj/cm$^2$ using the exposure apparatus of h-rays. On the other hand, in this example, the unevenness pattern in the picture element region and the contact hole pattern are formed in the same mask 14.

Figure 5:
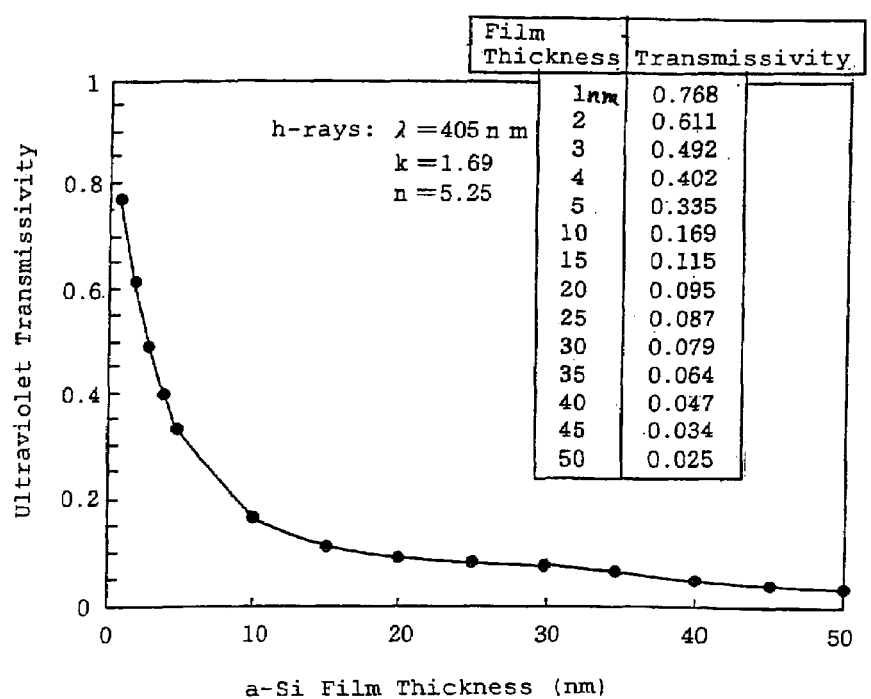
FIG. 5 is a graph showing transmittance (a calculated value) of h-rays against an a-Si film thickness.

Transmissivity (a calculated value) of h-rays against an a-Si film thickness is shown in FIG. 5. When the shading film A 16 of 4 nm in thickness is left at an opening portion of the picture element pattern area "a", 59.8% of the h-rays are absorbed. When the contact hole portion is exposed at 400 mj/cm$^2$ in order to sufficiently open the contact hole, the exposure amount of the unevenness pattern area portion in the picture element is 160 mj/cm$^2$, and an appropriate amount of exposure is obtained for each of them. The mask 14 performs "1" "0" control of whether or not to leave the a-Si film at a part of the opening portion and any high accuracy is not required, and therefore the mask 14 can be manufactured at a low cost in a high yield. The shading material A 16 serving as an ultraviolet filter and the shading material B 17 for completely shading ultraviolet rays can be arranged in any order in the formation of the mask 14. It is preferable to use other metal thin film instead of the a-Si film as the shading material A serving as an ultraviolet filter. It is also preferable to use a film composed of Mo, MoSi, and so on instead of the Cr/CrOx film as the shading film B for completely shading ultraviolet rays.

As described above, the interlayer insulating film 11 having the appropriate unevenness in the picture element region and the contact hole on the drain electrode 8 is formed through the steps of exposing with the mask 14, developing with weak alkaline developer (TMAH 0.4 wt %), and printing at 200 to 230° C. for approximately one hour. Subsequent process is the same as that in the foregoing Example 1, and further description is omitted herein.

The same advantages as those in the foregoing Example 1 are obtained in this example, and besides, restriction on the process apparatus is relaxed because the processing capacity is not lowered even when an en bloc exposure method is used.

Example 3

Figure 6:
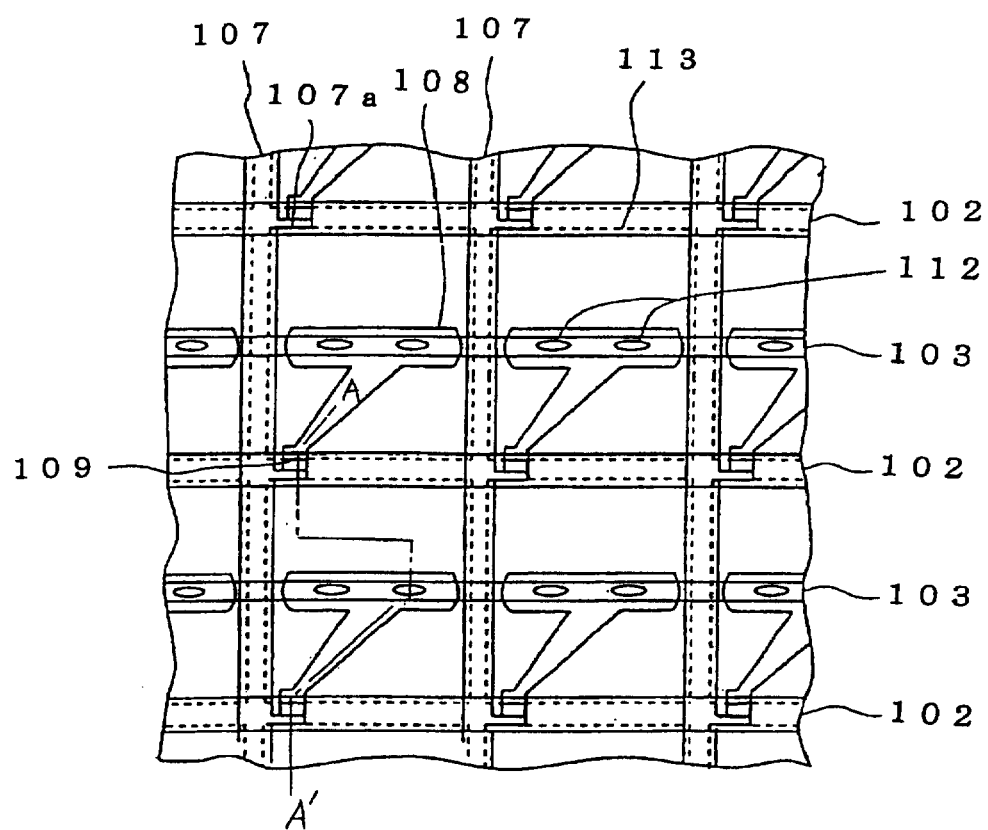
FIG. 6 is a schematic plan view showing a TFT array substrate of a reflection type liquid crystal display according to Example 3 of the invention.
Figure 7:
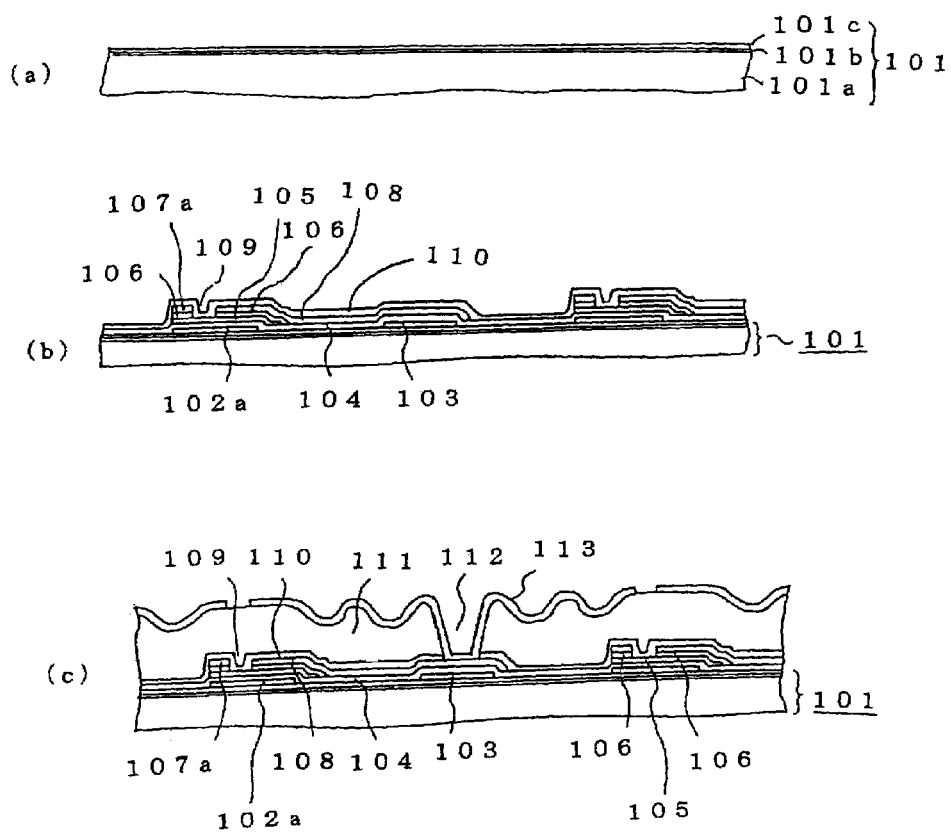
FIGS. 7(a), (b) and (c) are sectional views each showing a manufacturing process of the TFT array substrate of the reflection type liquid crystal display according to Example 3 of the present invention.

A reflection type liquid crystal display and a method for manufacturing the same according to Example 3 of the present invention are described below on the drawings. FIG. 6 is a schematic plan view showing a TFT array substrate of a reflection type liquid crystal display mounted with a TFT as a switching element according to Example 3 of the present invention. FIG. 7 is a sectional view showing a part of a manufacturing process of the TFT array substrate along the line A—A shown in FIG. 6.

In the drawings, numeral 101 is an insulating substrate which is composed by forming an ultraviolet absorption film 101b for preventing transmission of ultraviolet light and an insulation layer 101c on a transparent insulating substrate 101a such as a glass substrate. Numeral 102 is plural scanning lines (gate electrode wiring) formed on the insulating substrate 101. Numeral 102a is a scanning electrode (a gate electrode) formed with a part of the gate electrode wiring 102, and numeral 103 is common electrode wiring formed on the insulating substrate 101. Numeral 104 is a gate insulating film formed on the gate electrode wiring 102, gate electrode 102a, and common electrode wiring 103, and numeral 105 is a semiconductor layer comprising an amorphous silicon film formed on the gate electrode 102a through the gate insulating film 104. Numeral 106 is an ohmic contact layer comprising a low-resistance amorphous silicon film formed on the semiconductor layer 105, and numeral 107 is signal lines (source electrode wiring). Numerals 107a and 108 are a first electrode (a source electrode) and a second electrode (a drain electrode) which make a pair and are formed on the ohmic contact layer 106, and the first electrode (the source electrode) 107a is connected to the signal lines (the source electrode wiring) 107. Numeral 109 is a channel portion, numeral 110 is a passivation film for protecting the TFT, and numeral 111 is an interlayer insulating film formed on the passivation film 110. Numeral 112 is a contact hole formed in the passivation film 110 and the interlayer insulating film 111, and numeral 113 is a reflex picture element electrode formed on the interlayer insulating film 111 and is electrically connected to the drain electrode 108 through the contact hole 112.

Described below is the method for manufacturing the TFT array substrate of the reflection type liquid crystal display according to this example.

First, as shown in FIG. 7(a), an SiN film (300 nm) forming the ultraviolet absorption film 101b and the insulation layer 101c is continuously formed by CVD, etc. on the whole surface of the transparent insulating substrate 101a such as a glass substrate. In this manner, the insulating substrate 101 serving as a filter against ultraviolet light is formed. In this step, an amorphous silicon film (an a-Si film) of 50 nm in thickness was used as the ultraviolet absorption film 101b.

Figure 8:
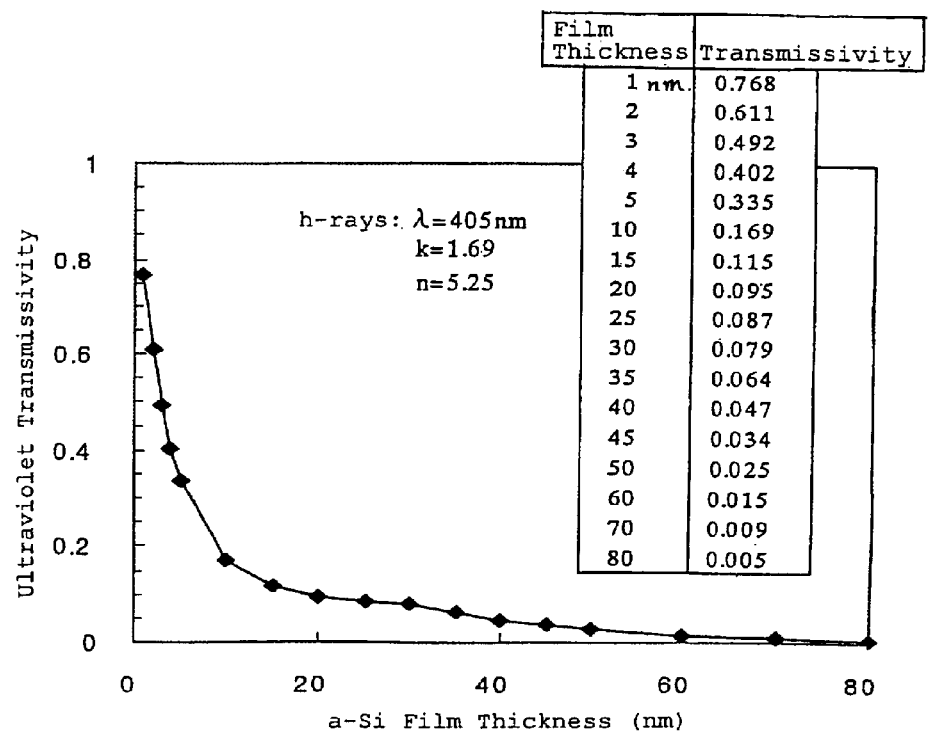
FIG. 8 is a graph showing relation between a thickness of an amorphous silicon film and transmittance of ultraviolet rays.

FIG. 8 is a view showing relation (a calculated value) between an a-Si film thickness and transmittance of ultraviolet rays, and the a-Si film of 50 nm in thickness is a cut filter of 97.5% against ultraviolet light (the h-rays exposure wavelength: 405 nm).

Next, the gate electrode wiring 102, gate electrode 102a, and common electrode wiring 103 are formed by patterning with a resist formed by a photolithography, after forming a film of Cr on the surface of the insulating substrate 101 by a method such as a sputtering.

Next, after forming successively a silicon nitride film to be the gate insulating film 104, an amorphous silicon film, and a low-resistance amorphous silicon film where impurities are doped by a method such as a plasma CVD, the amorphous silicon film and the low-resistance amorphous silicon film are patterned using a resist formed by a photolithography, whereby the semiconductor layer 105 and the ohmic contact layer 106 are formed.

Next, the source electrode wiring 107, source electrode 107a, and drain electrode 108 are formed on the ohmic contact layer 106 by conducting film formation by sputtering and patterning by photolithography. At the same time, a portion of the low-resistance amorphous silicon film (the ohmic contact layer 106) not coated with the source electrode 107a and the drain electrode 108 is etched to form the channel portion 109 thus a TFT being composed.

An end of the drain electrode 108 sandwiches the gate insulating film 104 composed of an inorganic insulating film, and is opposed to the common electrode wiring 103 made of low-resistance metal, thereby forming a capacity (a capacitor) in the area where the reflex picture element electrode 113 is formed.

Next, the passivation film 110 for protecting the TFT is formed by a method such as a CVD method (FIG. 7(b)).

Next, a photosensitive acrylic resin of not more than 4 in dielectric constant is applied so that it may dissolve difference in level caused by the TFT and the electrode wiring (the gate electrode wiring 102, common electrode wiring 103, source electrode wiring 107, and soon) making the surface plain. Then, exposure and development are conducted. As the result, an unevenness configuration is formed on the gate electrode wiring 102, the source electrode wiring 107, and the surface in the picture element region excluding a part of the mentioned capacity formation position. A contact hole is formed on a portion where the drain electrode 108 is opposed to the common electrode wiring 103 through the gate insulating film 104, and forms the capacity. An opening portion for terminal contact (not shown in the drawings) is formed. Thereafter, printing is conducted and the interlayer insulating film 111 is formed.

In this example, approximately 4 $\mu$m of positive-type acrylic resin (PC-355 manufactured by JSR, photosensitive to i-rays and h-rays) was applied as the interlayer insulating film 111. A stepper exposure apparatus of h-rays was used to expose the contact hole portion at 400 mj/cm$^2$ and the unevenness formation portion in the picture element region at 160 mj/cm$^2$. Photolithography for divisional exposure was used in which difference in resolving speed is established by changing the resolving rate of the photosensitive agent. A weak alkaline developer (TMAH0.4 wt %) was used as the developer. The passivation film 110 in a lower layer was exposed at the contact hole portion and the terminal contact portion. The unevenness configuration was formed only on the surface layer. Printing was conducted at 200 to 230° C. for approximately one hour. Thus, the interlayer insulating film 111 was formed.

Note that when the photosensitive resin forming the interlayer insulating film 111 is exposed, the insulating substrate 101 where the photosensitive resin and so on are formed is processed not to transmit any ultraviolet light. This prevents light reflected from a substrate holder on the back face of the insulating substrate 101, and the photosensitive resin is prevented from exposure due to inappropriate light such as reflected light.

Next, with the interlayer insulating film 111 as a mask, the passivation film 110 exposed through a contact hole in the interlayer insulating film 111 is etched, and the contact hole 112 is formed and the drain electrode 108 is exposed. At the same time, the passivation film of the terminal contact portion (not shown in the drawings) is also removed.

Next, as shown in FIG. 7(c), after forming a high reflex metal film such as an Al film on the interlayer insulating film 111 and in the contact hole 112, patterning is conducted using a resist formed by a photolithography method. Thus, the reflex picture element electrode 113 corresponding to each picture element portion is formed. The reflex picture element electrode 113 is electrically connected to the drain electrode 108 through the contact hole 112. The aperture efficiency is improved by forming the reflex picture element electrode 113 overlapping with the gate electrode wiring 102 and the source electrode wiring 107.

Orientation films are respectively formed on the surface of the TFT array substrate (a first substrate) obtained through the foregoing process as well as on the surface of an opposed substrate (a second substrate) wherein an opposed electrode is formed on another transparent insulating substrate. Subsequently, the substrates are opposed to each other, and a liquid crystal material is put between them, thus the reflection type liquid crystal display being achieved.

It is also preferable to use a negative-type photosensitive resin as the photosensitive resin forming the interlayer insulating film 111.

It is also preferable to form the reflex picture element electrode 113 using another high reflex film such as silver film.

Figure 9:
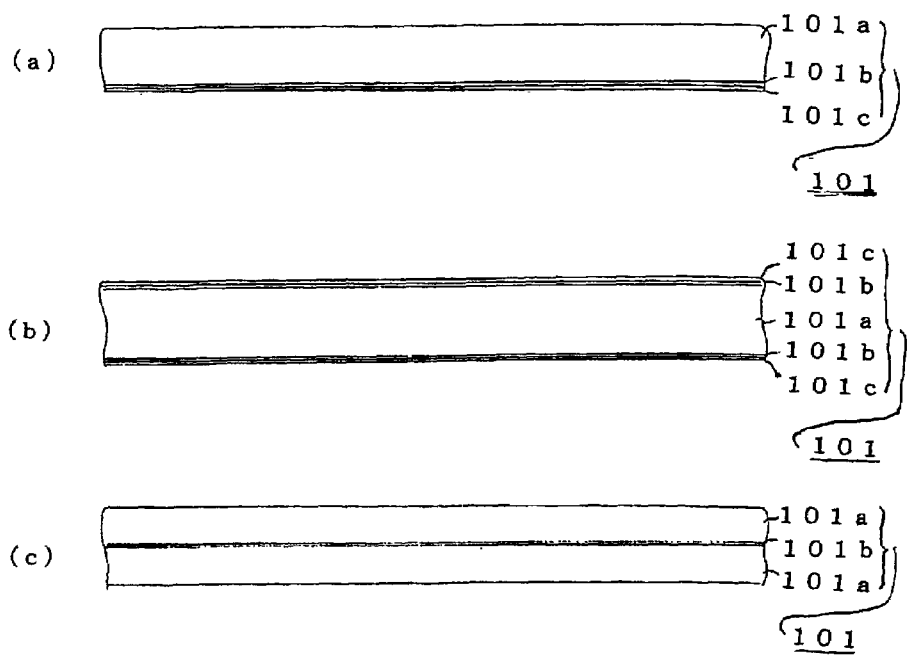
FIGS. 9(a), (b) and (c) are sectional views each showing a part of a TFT array substrate of another reflection type liquid crystal display according to Example 3 of the invention.

In this example, though the ultraviolet absorbing film 101b and the insulation layer 101c were formed as the insulating substrate 101 on the surface of the transparent insulating substrate generally used in a transmission type liquid crystal display, it is also preferable to use a transparent or colored ultraviolet-cut glass as the insulating substrate. It is preferable to compose the insulating substrate 101 by forming the ultraviolet absorption film 101b and the insulation layer 101c on the back face side (the face side where the TFT and so on are not formed) of the transparent insulating substrate 101a as shown in FIG. 9(a). It is also preferable to compose the insulating substrate 101 by forming the ultraviolet absorption films 101b and the insulation layers 101c on both faces of the transparent insulating substrate 110a as shown in FIG. 9(b). It is also preferable to compose the insulating substrate 101 by forming the ultraviolet absorption film 101b between the two transparent insulating substrates 110a as shown in FIG. 9(c). Furthermore, it is preferable to compose the insulating substrate by using an ultraviolet light cut film such as metal film instead of the ultraviolet absorption film.

It is preferable to use an inorganic insulating material such as SiOx or a heat-resisting rigid inorganic film as the insulation layer 101c.

Though the passivation film 110 was used in this example, the same advantage is performed also in a reflection type liquid crystal display of a construction without the passivation film 110.

In this example, by composing the insulating substrate 101 where the TFT array is formed of a substrate not permitting any ultraviolet light to transmit therethrough, at the time of exposure on the photosensitive resin forming the interlayer insulating film 111, any light reflected from substrate holder, etc. on the back face of the insulating substrate 101 is restrained, and the photosensitive resin is not exposed to any inappropriate light such as the reflected light. Therefore appropriate unevenness is formed on the surface of the interlayer insulating film 111 and the appropriate unevenness is transferred to the reflex picture element electrode 113, and as a result, a reflection type liquid crystal display having a desirable reflection characteristic and high display quality is composed.

The same advantage is also achieved in the case of forming the unevenness configuration by etching a resin not photosensitive using a resist pattern and in the case of forming the unevenness configuration leaving the resist pattern itself as long as the exposure process is used.

Example 4

Figure 10:
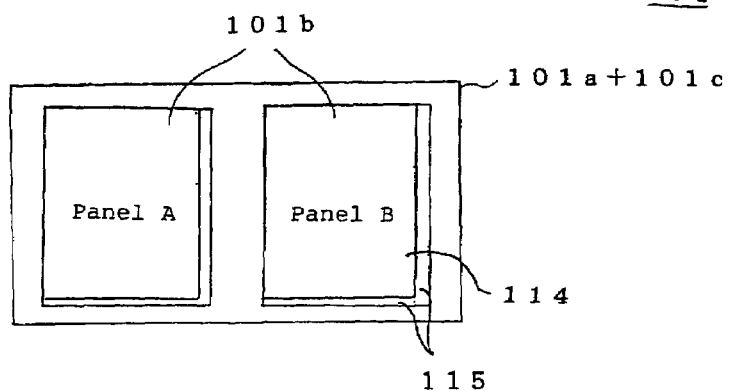
FIG. 10 is a top plan view for explaining a TFT array substrate of a reflection type liquid crystal display according to Example 4 of the invention.

FIGS. 10 (a), (b) and (c) are top plan views each for explaining a method for manufacturing a TFT array substrate of a reflection type liquid crystal display according to Example 4 of the invention. In the drawing, reference numeral 101a is the transparent insulating substrate such as a glass substrate, numeral 101b is the ultraviolet absorption film, and numeral 110c is the insulation layer. Numeral 114 is a display portion in a liquid crystal panel, and numeral 115 is a terminal portion placed at the peripheral edge of the display portion. The TFT array comprises one liquid crystal panel, and as shown in FIGS. 10 (a), (b) and (c), one transparent insulating substrate 101a is provided with one or more TFT arrays.

Described below is the method for manufacturing the TFT array substrate of the reflection type liquid crystal display according to this example.

An ultraviolet absorption film is formed on the surface of the transparent insulating substrate 101a such as glass substrate, and the ultraviolet absorption film 101b is formed only at the display portion 114 of the liquid crystal panel by a photolithography method. Then, the insulation layer 101c is formed on the whole surface of the substrate, whereby the insulating substrate is composed.

After that, the TFT array substrate and the reflection type liquid crystal display are formed by a method similar to that in Example 3.

In this example, the same advantage as in Example 3 is achieved. Further, even when the ultraviolet absorption film 101b is composed of an opaque film such as metal film, the area where an alignment mark and so on are formed can be made transparent. As a result, the apparatus used in a process where alignment is required and the ultraviolet cut film are free from restriction.

Example 5

Figure 11:
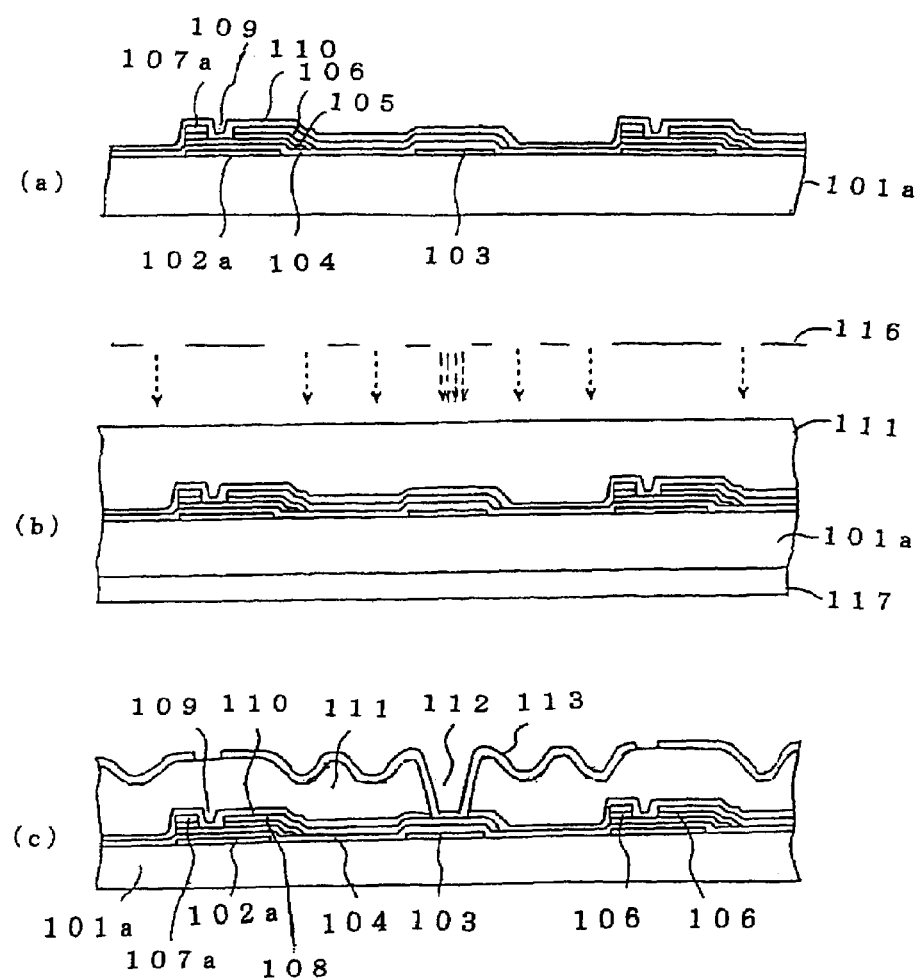
FIGS. 11(a), (b) and (c) are sectional views each showing a manufacturing process of a TFT array substrate of a reflection type liquid crystal display according to Example 5 of the invention.

FIG. 11 is a sectional view showing a part of a manufacturing process of a TFT array substrate of a reflection type liquid crystal display according to Example 5 of the present invention. In the drawing, numeral 116 is a mask used when photosensitive resin forming the interlayer insulating film 111 is exposed, and numeral 117 is an ultraviolet-cut film. The same reference numerals are designated to the same portions in FIG. 7, and further description is omitted herein.

Next, described below is the method for manufacturing the TFT array substrate of the reflection type liquid crystal display according to this example.

In the same method as that in Example 3, the gate electrode wiring 102, gate electrode 102a, common electrode wiring 103, gate insulating film 104, semiconductor layer 105, ohmic contact layer 106, source electrode wiring 107, source electrode 107a, drain electrode 108, channel portion 109, and passivation film 110 are formed on the transparent insulating substrate 101a (FIG. 11 (a)).

Then, as shown in FIG. 11 (b), a photosensitive acrylic resin of not more than 4 in dielectric constant is applied, so that difference in level caused by the TFT and the electrode wiring (gate electrode wiring 102, common electrode wiring 103, source electrode wiring 107, and so on) may be dissolved making the surface plain. Subsequently, exposure is conducted through the mask 114, with the ultraviolet-cut film 117 stick on the back face side (the face side where the electrode wiring and the TFT are not formed) of the transparent insulating substrate 101a by photolithography of divisional exposure. In the exposure, difference in resolving speed is made by changing the resolving rate of the photosensitive agent. After exfoliating the ultraviolet-cut film 117, development is conducted with a weak alkaline developer. As a result, an unevenness configuration is formed on the gate electrode wiring 102, the source electrode wiring 107, and the surface in the picture element region excluding a part of said capacity formation position. A contact hole is formed on a portion where the drain electrode 108 is opposed to the common electrode 103 through the gate insulating film 104 and forms capacity. An opening portion for terminal contact (not shown in the drawings) is formed. And the interlayer insulating film 111 is formed by printing.

Note that when exposing the photosensitive resin forming the interlayer insulating film 111, the ultraviolet-cut film is stuck on a face of the transparent insulating substrate 101a opposite to the face where the photosensitive resin and so on are formed in order to prevent transmission of ultraviolet light. This prevents light reflected from a substrate holder on the back face of the insulating substrate 101, and the photosensitive resin is prevented from exposure due to inappropriate light such as reflected light.

After that, in the same manner as that in Example 3, the contact hole 112 and the reflex picture element electrode 113 are formed and the TFT array substrate is composed. After forming orientation films on the surface of this TFT array substrate and the surface of the opposite substrate, the substrates are arranged to be opposite to each other. Then, a liquid crystal material is put between them, whereby the reflection type liquid crystal display is composed.

In this example, the same advantages as those in Example 3 are achieved.

Example 6

Figure 12:
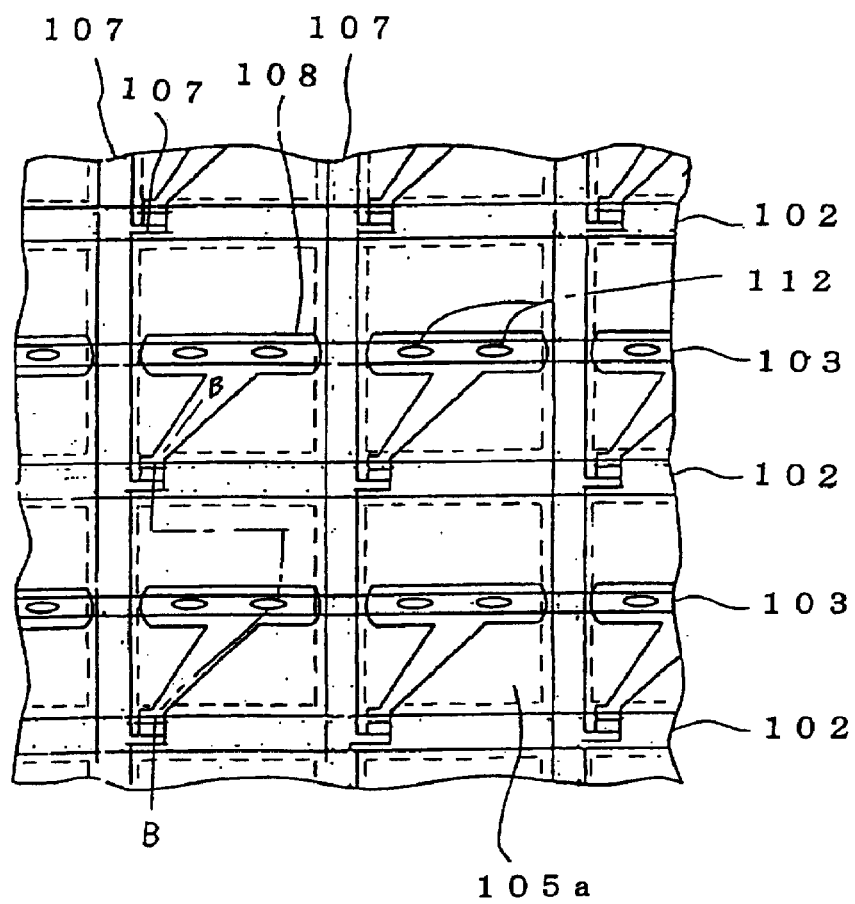
FIG. 12 is a schematic plan view showing a TFT array substrate of a reflection type liquid crystal display according to Example 6 of the invention.
Figure 13:
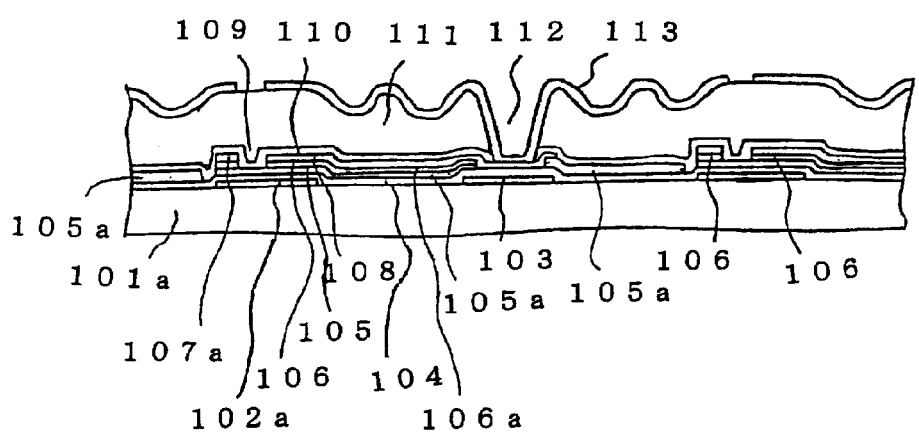
FIG. 13 is a sectional view showing a manufacturing process of the TFT array substrate of the reflection type liquid crystal display according to Example 6 of the invention.

FIG. 12 is a schematic plan view showing a TFT array substrate of a reflection type liquid crystal display mounted with a TFT as a switching element according to Example 6 of the invention, and FIG. 13 is a sectional view taken along the line B—B in FIG. 12.

In the drawings, numeral 105a is an island-shaped semiconductor film (an amorphous silicon film) formed simultaneously with the formation of the semiconductor layer 105, and numeral 106a is an island-shaped low-resistance amorphous silicon film formed simultaneously with the formation of the ohmic contact layer 106. The same numerals are designated to the same portions as those in FIG. 6 and FIG. 7, and further description is omitted herein.

Described below is the method for manufacturing the TFT array substrate of the reflection type liquid crystal display according to this example.

In a method similar to that in Example 3, the gate electrode wiring 102, gate electrode 102a and common electrode wiring 103 are formed on the surface of the transparent insulating substrate 101a such as glass substrate.

Then, a silicon nitride film to be the gate insulating film 104, an amorphous silicon film, and a low-resistance amorphous silicon film where impurities are doped are formed successively by a method such as plasma CVD. Thereafter, the amorphous silicon film and the low-resistance amorphous silicon film are patterned with a resist formed by a photolithography, whereby the semiconductor layer 105 and the ohmic contact layer 106 are formed. At this time, the amorphous silicon film 105a and the low-resistance amorphous silicon film 106a are left like islands on the contact hole 112 and in the picture element region excluding the region where the gate electrode wiring 102 and the source electrode wiring 107 are formed.

Figure 14:
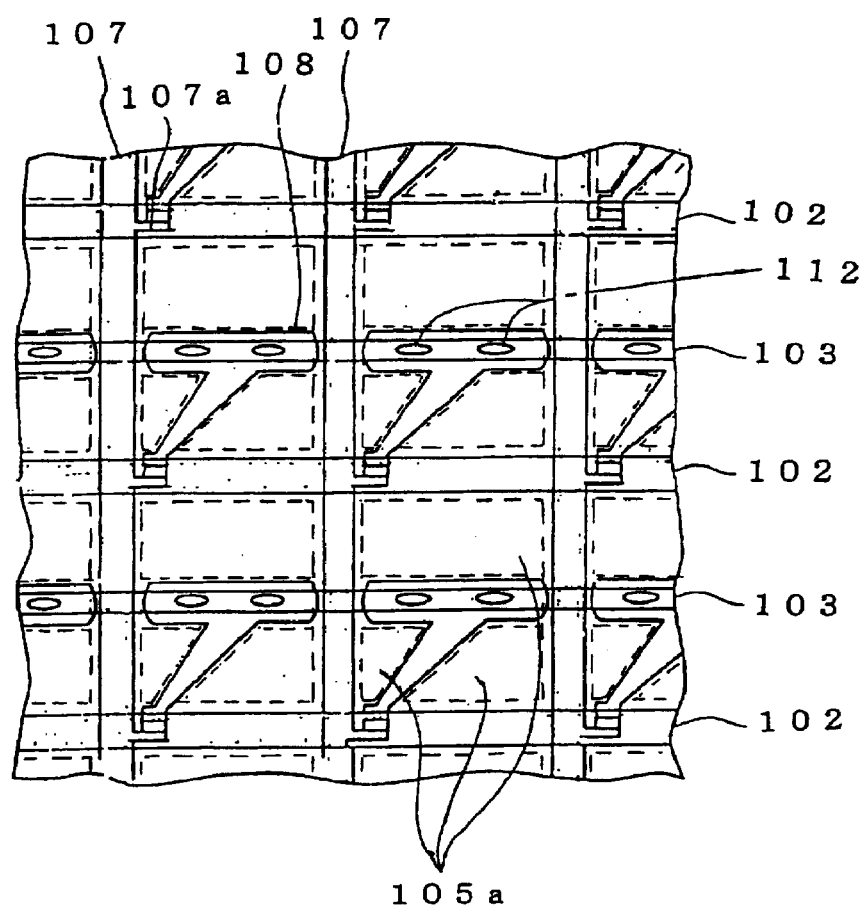
FIG. 14 is a schematic plan view showing a TFT array substrate of another reflection type liquid crystal display according to Example 6 of the invention.

It is preferable to form the island-shaped amorphous silicon film 105a and low-resistance amorphous silicon film 106a only in a transparent region where any opaque metal film such as drain electrode 108 is not formed, as shown in FIG. 14.

Next, formation of film by sputtering and patterning by photolithography are conducted, and the source electrode wiring 107, source electrode 107a, and drain electrode 108 are formed on the ohmic contact layer 106. At the same time, a portion of the low-resistance amorphous silicon film 106a not coated with the source electrode 107a and the drain electrode 108 is etched, and the channel portion 109 is formed and the TFT is thus composed. At this time, as the low-resistance amorphous silicon film 106a excluding the region where the drain electrode 108 is formed is etched, the amorphous silicon film 105a and the low-resistance amorphous silicon film 106a exist below the drain electrode 108. And only the amorphous silicon film 105a is left in the other portion in the picture element region.

After that, in the same manner as that in Example 3, the passivation film 110, interlayer insulating film 111, contact hole 112, and reflex picture element electrode 113 are formed, thereby forming the TFT array substrate. After forming orientation films on the surface of this TFT array substrate and the surface of the opposite substrate, the substrates are arranged to be opposite to each other. Then, a liquid crystal material is put between them, whereby the reflection type liquid crystal display is composed.

Note that when exposing the photosensitive resin forming the interlayer insulating film 111, the amorphous silicon film 105a is formed in the picture element region in which an unevenness configuration is formed on the surface of the photosensitive resin in the previous process to prevent transmission of ultraviolet light. This prevents light reflected from a substrate holder on the back face of the insulating substrate 101, and the photosensitive resin is prevented from exposure due to inappropriate light such as reflected light.

In this example, the same advantages as those in Example 3 are achieved without changing the conventional process.

As described above, in the present invention, by plainly applying photosensitive insulating resin so that it may dissolve difference in level caused by the scanning lines, signal lines, switching element, and so on and by conducting exposure and development while changing the exposure amount, the interlayer insulating film having appropriate unevenness of inseparable pattern in the picture element region and having the contact hole of separable pattern on the drain electrode of the switching element is formed. As a result, it becomes possible to obtain stably through a simple process the reflection type liquid crystal display of high aperture efficiency capable of being driven by a low electric power and superior in display quality.

As described above, in the invention, at the time of exposing the interlayer insulating film composed of the photosensitive resin formed on the TFT and the electrode wiring of the TFT array substrate and making the surface plain, at least the region where unevenness for improving the reflection characteristic of the reflex picture element electrode formed in an upper layer is formed, does not any transmit ultraviolet light. As a result, the substrate does not permit to transmit any ultraviolet light not absorbed by the photosensitive resin at the time of exposure of the photosensitive resin. And the photosensitive resin is not exposed to any inappropriate light such as light reflected from a substrate holder on the back face of the substrate. Consequently, appropriate unevenness is formed on the surface of the interlayer insulating film and this appropriate unevenness is transferred to the reflex picture element electrode, thus the reflection type liquid crystal display having a good reflection characteristic and a high display quality is obtained in a high yield.

It is to be understood that the invention is not limited to the foregoing embodiment and various changes and modifications may be made without departing from the spirit and scope of the invention.

What is claimed is:

1. A method for manufacturing a reflection type liquid crystal display, comprising:

forming plural scanning lines and plural signal lines crossing said scanning lines on an insulating substrate;

forming a switching element in each of picture element regions divided by said scanning lines and said signal lines;

forming an interlayer insulating film having appropriate unevenness of an inseparable pattern in the picture element region and having a contact hole of a separable pattern on a drain electrode of said switching element by plainly applying a photosensitive insulating resin on said substrate so as to dissolve difference in level caused by said scanning lines, said signal lines, and said switching element, and conducting exposure and development while changing an amount of exposure; and forming a reflex picture element electrode having unevenness due to said interlayer insulating film at a position conforming to each of the picture element regions and which is electrically connected to said switching element through said contact hole, by patterning after forming a high reflex film on said interlayer insulating film, wherein in the process of forming the interlayer insulating film, a mask is used in exposing the insulating resin and has a shading material comprised of at least two layers, the at least two layers including an ultraviolet filter layer for cutting ultraviolet rays at a predetermined value of 20 to 80% in a base material, and said ultraviolet filter layer is laid in a mask pattern opening portion located conforming to the picture element region, and the exposure for forming unevenness on the interlayer insulation film is conducted only from a front side.

2. A reflection type liquid crystal display manufactured according to claim 1.

3. A mask for manufacturing a reflection type liquid crystal display, the liquid crystal display being formed of: a first insulating substrate provided with scanning lines and signal lines formed into a lattice configuration, a TFT, an interlayer insulating film, and a reflex picture element electrode; a second insulating substrate provided with a color filter and an opposed electrode and arranged opposite to the first insulating substrates;

said interlayer insulating film being formed of a positive type acrylic resin having a sensitivity to i-line of 365 nm in wavelength and h-line of 405 nm in wavelength;

the mask for exposing said interlayer insulating film comprising a base material and a shading material of at least two layers provided on said base material;

said at least two layers including an ultraviolet filter layer comprising an amorphous Si film of 1 nm to 10 nm in thickness for cutting ultraviolet rays at a predetermined value of 20 to 80%;

said ultraviolet filter layer being laid in a mask pattern opening portion located conforming to a picture element region.

4. The mask for manufacturing a reflection type liquid crystal display according to claim 3, wherein an a-Si film is used as the ultraviolet filter layer and a Cr/CrOx film is used as the shading material for completely shading the ultraviolet rays.

* * * * *